(12) United States Patent
Gomez

(10) Patent No.: US 11,434,639 B2
(45) Date of Patent: Sep. 6, 2022

(54) PIVOTABLE DOWNSPOUT EXTENSION SYSTEM

(71) Applicant: Rusten Gomez, Bountiful, UT (US)

(72) Inventor: Rusten Gomez, Bountiful, UT (US)

( * ) Notice: Subject to any disclaimer, the term of this patent is extended or adjusted under 35 U.S.C. 154(b) by 214 days.

(21) Appl. No.: 16/889,529

(22) Filed: Jun. 1, 2020

(65) Prior Publication Data
US 2020/0378129 A1    Dec. 3, 2020

Related U.S. Application Data

(60) Provisional application No. 62/855,538, filed on May 31, 2019, provisional application No. 62/854,816, filed on May 30, 2019.

(51) Int. Cl.
*E04D 13/08*      (2006.01)
*G05D 9/02*      (2006.01)

(52) U.S. Cl.
CPC ............ *E04D 13/08* (2013.01); *G05D 9/02* (2013.01); *E04D 2013/0813* (2013.01); *E04D 2013/0833* (2013.01); *E04D 2013/0873* (2013.01)

(58) Field of Classification Search
CPC ............ E04D 13/08; E04D 2013/0806; E04D 2013/0813; E04D 2013/0846; E04D 2013/0873; Y10T 137/267; Y10T 137/8807
See application file for complete search history.

(56) References Cited

U.S. PATENT DOCUMENTS

| | | | | |
|---|---|---|---|---|
| 2,567,004 | A * | 9/1951 | Benck | E04D 13/08 239/521 |
| 5,482,084 | A | 1/1996 | Cassidy | |
| 5,522,427 | A * | 6/1996 | Johnson | E04D 13/08 137/616.5 |
| 6,024,127 | A * | 2/2000 | Johnson | E04D 13/08 52/16 |
| 6,240,680 | B1 * | 6/2001 | Estes | E04D 13/08 52/16 |
| 6,647,670 | B1 * | 11/2003 | Dran | E04D 13/0767 52/12 |
| 6,701,675 | B1 * | 3/2004 | Ekker | E04D 13/08 52/16 |
| 9,506,251 | B2 * | 11/2016 | Gleason | E04D 13/0645 |
| 2017/0081857 | A1 * | 3/2017 | Ellis | E04D 13/08 |

* cited by examiner

*Primary Examiner* — Kevin F Murphy
(74) *Attorney, Agent, or Firm* — Gurr Brande & Spendlove, PLLC; Robert A. Gurr

(57) ABSTRACT

A pivotable downspout extension system includes an adapter coupleable to a fixed-position downspout via a downspout aperture, a bucket hingedly coupleable to the adapter, and an extension arm. The extension arm is received by an extension arm receiving portion located on the bucket. The bucket and the extension arm remain in a substantially vertical position until a sufficient amount of water enters the bucket so as to overcome the weight of a weight chamber of the bucket and move the bucket's center of gravity. The bucket with the extension arm then pivots on a fulcrum point, allowing the water to exit the extension arm. Once emptied, the weight chamber of the bucket pivots the bucket and extension arm to the substantially vertical position.

12 Claims, 21 Drawing Sheets

PIVOTABLE DOWNSPOUT EXTENSION SYSTEM

CROSS-REFERENCE TO RELATED APPLICATIONS

This application claims the benefit of U.S. Provisional Application Ser. No. 62/854,816, filed on May 30, 2019, and U.S. Provisional Application Ser. No. 62/855,538, filed on May 31, 2019, both are incorporated herein by reference.

TECHNICAL FIELD

The present disclosure relates to a moveable diverter for water. More particularly, the present disclosure relates to a downspout extension that is pivotable.

BACKGROUND

Downspouts are known in the industry to help navigate the flow of water away from a building or structure. Rain gutters, in some form or another, have been used for centuries to navigate water runoff. People in the industry use hoses, splash blocks, rain chains, and other attachments to navigate the water away from buildings or structures in order to protect from flooding and water damage. In other words, without the use of a rain gutter, water may pool around the foundation of a building, causing potential seepage into the building.

There are also rain spouts on the market that help extend the release of water farther out (e.g., downspout extensions). However, these current methods and spouts have to be moved and/or detached, and then subsequently reattached, while doing yardwork, such as mowing the lawn, weeding, or other chores. They may also become a hazard if extended into the yard when children are playing. Further, many downspout extensions are not aesthetically pleasing, moving attention away from the building.

While a majority of the downspout extensions are above ground, some are level with the ground or completely concealed underneath the ground. To have a partially concealed or fully concealed downspout extension takes a lot of time, effort, and money in digging a trench, purchasing gravel, and installing the extension. Last of all, attempts have been made to have a hinge-style downspout extension. For example, if the downspout extension needs to be moved, a user would manually lift the extension, folding it against the existing fixed-position downspout. However, the hinge-style downspout extensions still have many shortcomings, such as having to manually actuate the downspout extension every time it needs to be moved.

Accordingly, there is a need for a system and a method of releasing water from a gutter at a distance from a building or structure that does not obstruct the ground and is automatically moved into a lowered position or a vertical position depending on water flow.

SUMMARY OF EXAMPLE EMBODIMENTS

In one embodiment, a pivotable downspout extension system comprises an adapter coupleable to a fixed-position downspout via a downspout aperture, a bucket hingedly coupleable to the adapter, and an extension arm. The extension arm is received by an extension arm receiving portion located on the bucket. The bucket and the extension arm remain in a substantially vertical position until a sufficient amount of water enters the bucket so as to overcome the weight of a weight chamber of the bucket and move the bucket's center of gravity. The bucket with the extension arm then pivots on a fulcrum point, allowing the water to exit the extension arm in a lowered position. Once emptied, the weight chamber of the bucket pivots the bucket and extension arm to the substantially vertical position.

In one embodiment, a pivotable downspout extension system may comprise one or more springs on an adapter, coupling a bucket to a fixed-position downspout. In such an embodiment, once the weight of the water in the bucket overcomes the force applied by the springs, the bucket and the extension arm pivot so as to release the water therefrom. Once the water is released, the spring retracts, pulling the bucket and the extension arm back into the substantially vertical position.

In one embodiment, the bucket comprises weight to hold the bucket in a substantially vertical position. When water enters the bucket, the bucket and the extension arm move to a lowered position. Due to the weight, the bucket would remain in a lowered position when water flow ceases. To move the bucket into a substantially vertical position, a user would manually raise the extension arm and the bucket.

DETAILED DESCRIPTION OF EXAMPLE EMBODIMENTS

Figure 1:
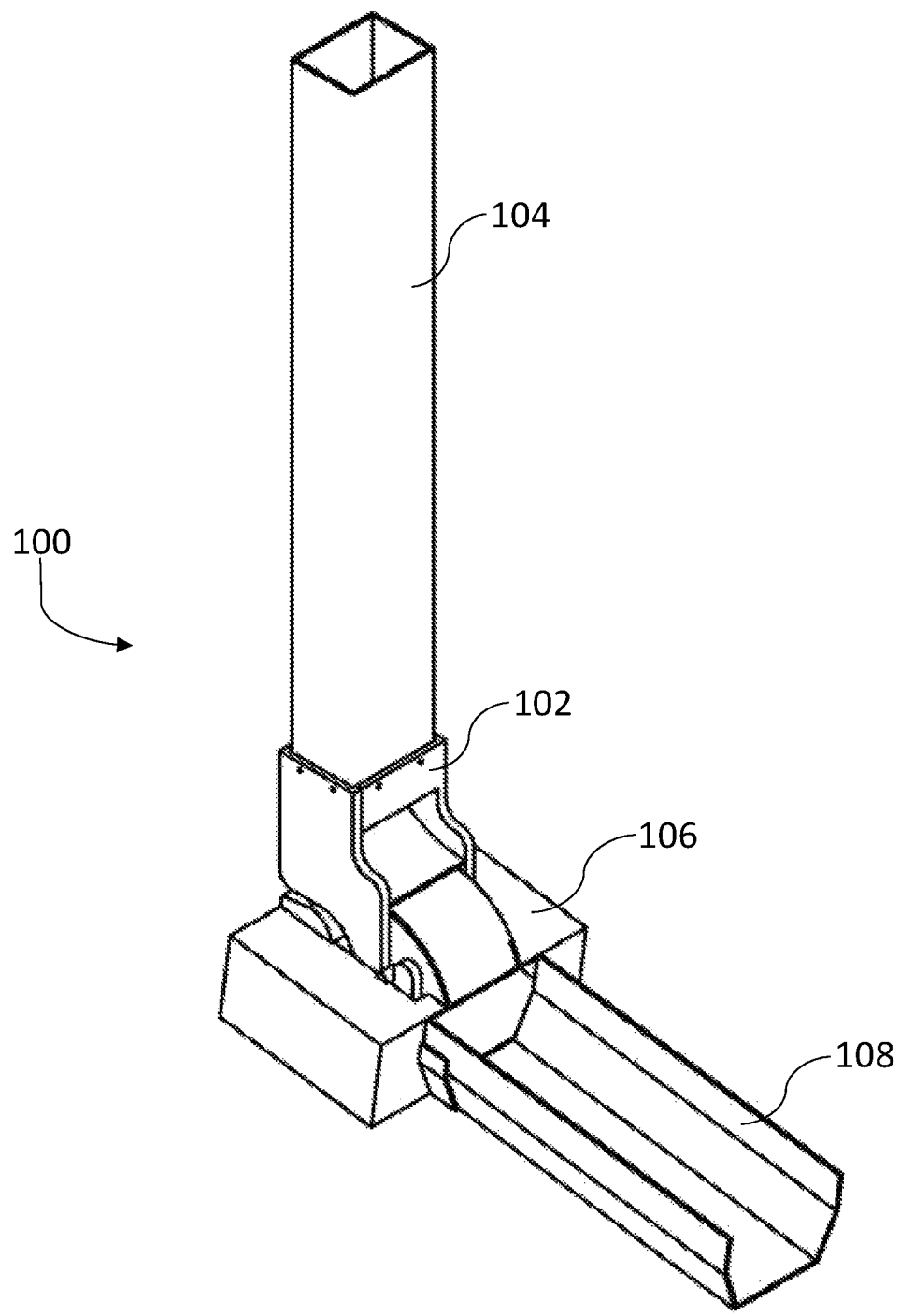
FIG. 1 illustrates a front, top perspective view of a pivotable downspout extension system with an extension arm in a lowered position.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a system and a method of releasing water from a gutter at a distance from a structure that does not obstruct the ground and is automatically moved into a lowered position or a vertical position depending on water flow.

Downspouts and downspout extensions are used to move water away from foundations of buildings. Without them, foundations may fail, compromising the integrity of the building's foundation and, more than likely, causing substantial financial burdens. Further, downspout extensions come in a variety of forms, such as immovable metal arms, rubber or plastic arms, and, in some cases, the downspout extensions are buried. These downspouts are usually left in a single position and have to be moved to perform chores or create a safe environment. In contrast, the downspout system disclosed herein, generally, includes an adapter that may be coupled to an existing downspout. The adapter may be hingedly coupleable to a bucket that, with the absence of water, is in a vertical position.

However, when water enters a gutter system and travels down a fixed-position downspout to the downspout system, it fills a chamber of the bucket. As the weight distribution of the bucket changes due to the accumulation of water, the bucket will begin to pivot (for example, when a threshold amount of water outweighs the weighted bucket), lowering an extension arm to the ground that is coupled to the bucket and releasing the water. When water flow ceases, the weight distribution of the bucket returns to normal and the bucket, with the extension arm, returns to its vertical position. The downspout system may be automatically positioned in a vertical and lowered position due to the presence or absence of water, removing the burden of detaching and reattaching a downspout extension or burying a downspout extension.

Figure 2:
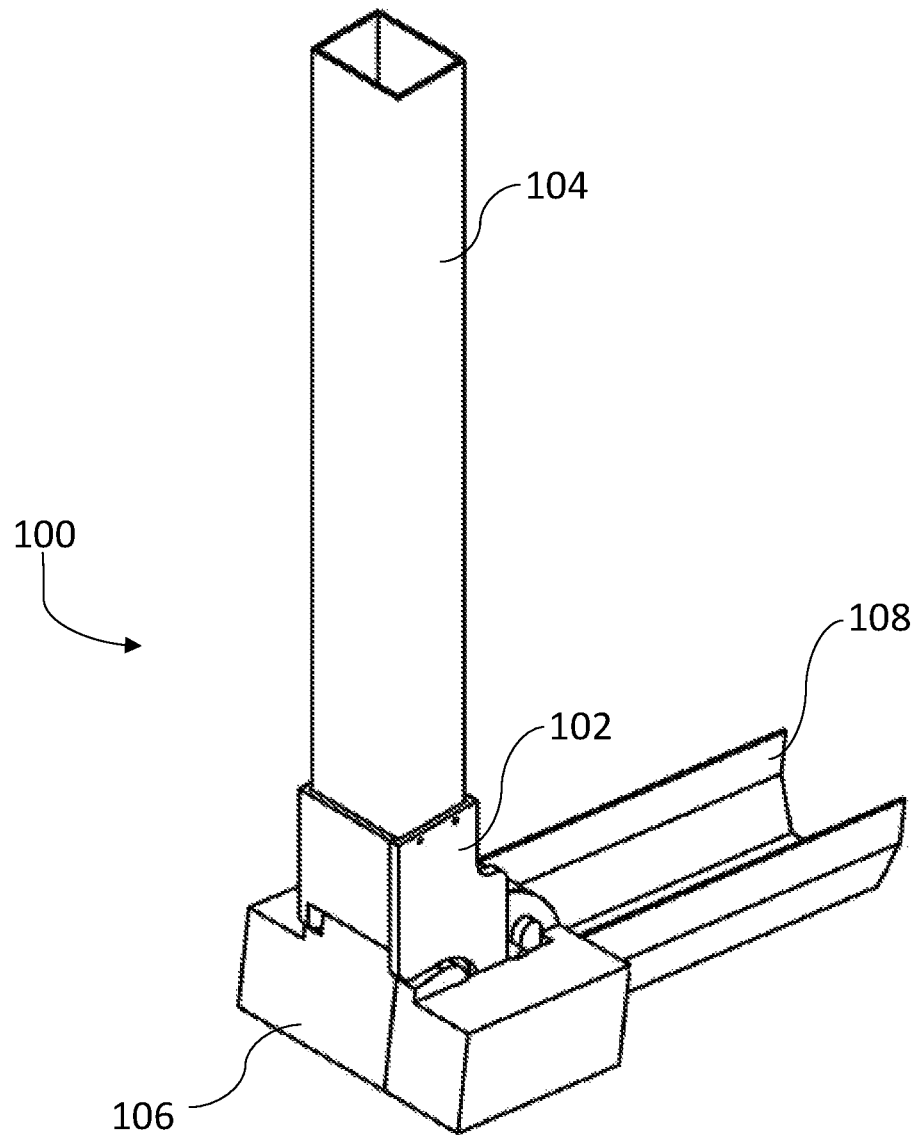
FIG. 2 illustrates a rear, top perspective view of a pivotable downspout extension system with an extension arm in a lowered position.
Figure 3:
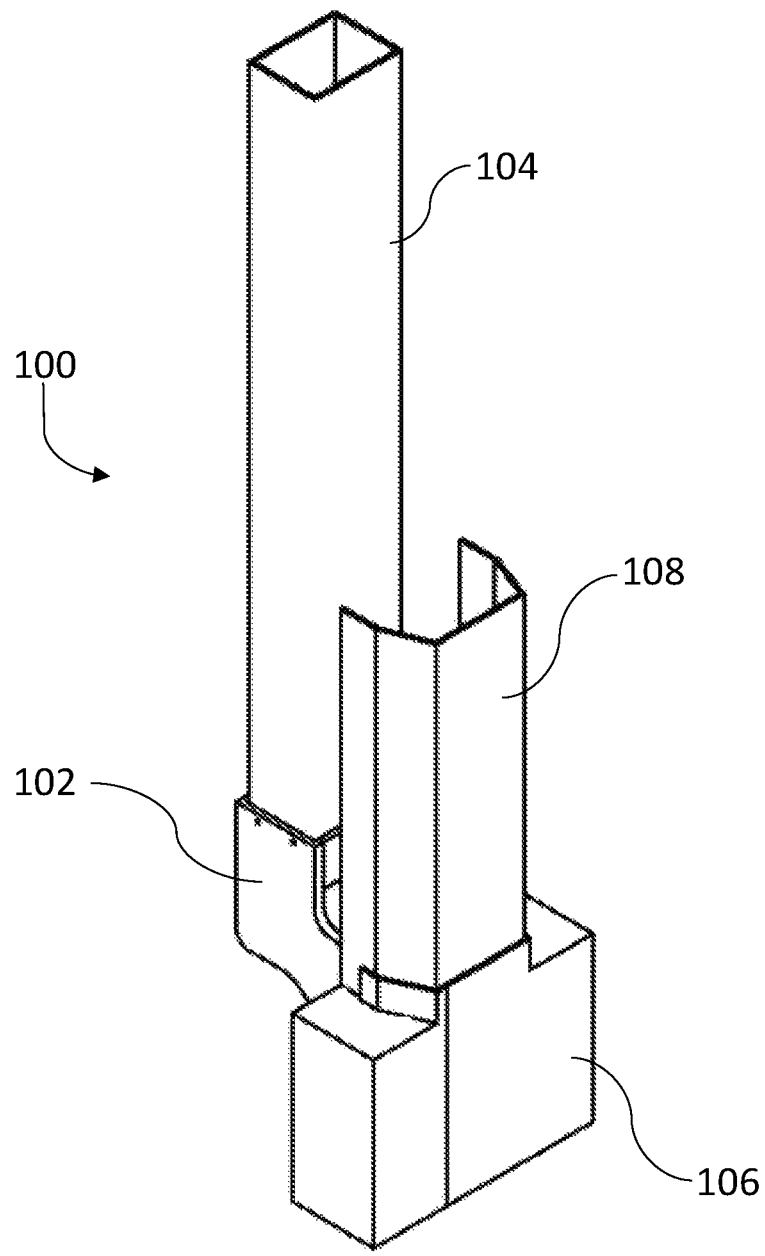
FIG. 3 illustrates a front, top perspective view of a pivotable downspout extension system with an extension arm in a substantially vertical position.

As shown in FIGS. 1-3, in one embodiment, a pivotable downspout extension system 100 comprises an adapter 102 coupleable to a fixed-position downspout 104, a bucket 106 hingedly coupleable to the adapter 102, and an extension arm 108. The bucket 106 with the extension arm pivots on a fulcrum point when sufficient water has filled the bucket 106. It will be appreciated that the pivotable downspout extension system 100 may use an existing or a newly placed fixed-down spout 104 when coupling the adapter 102 thereto.

Figure 4:
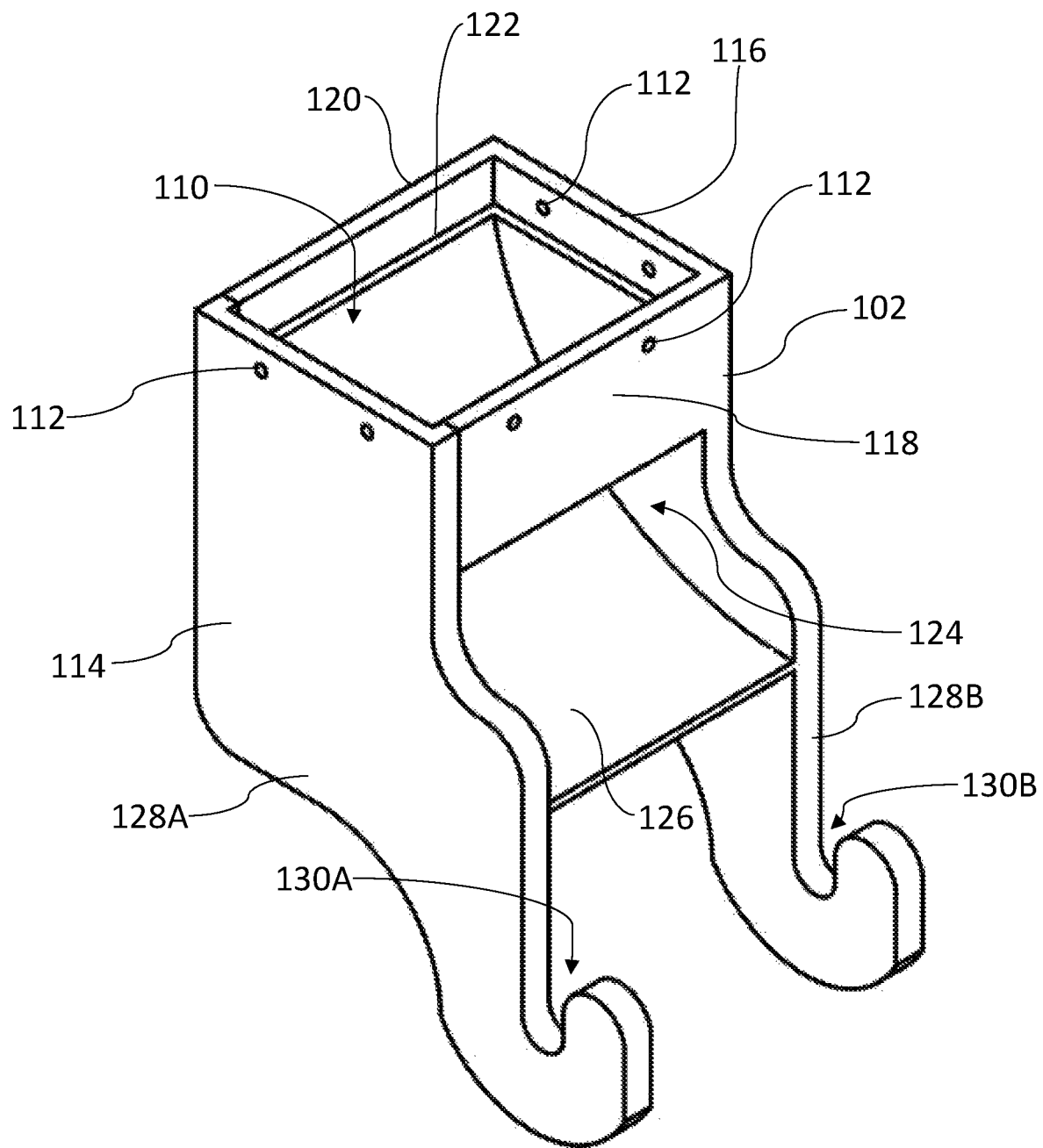
FIG. 4 illustrates a front, top perspective view of an adapter of a pivotable downspout extension system.
Figure 5:
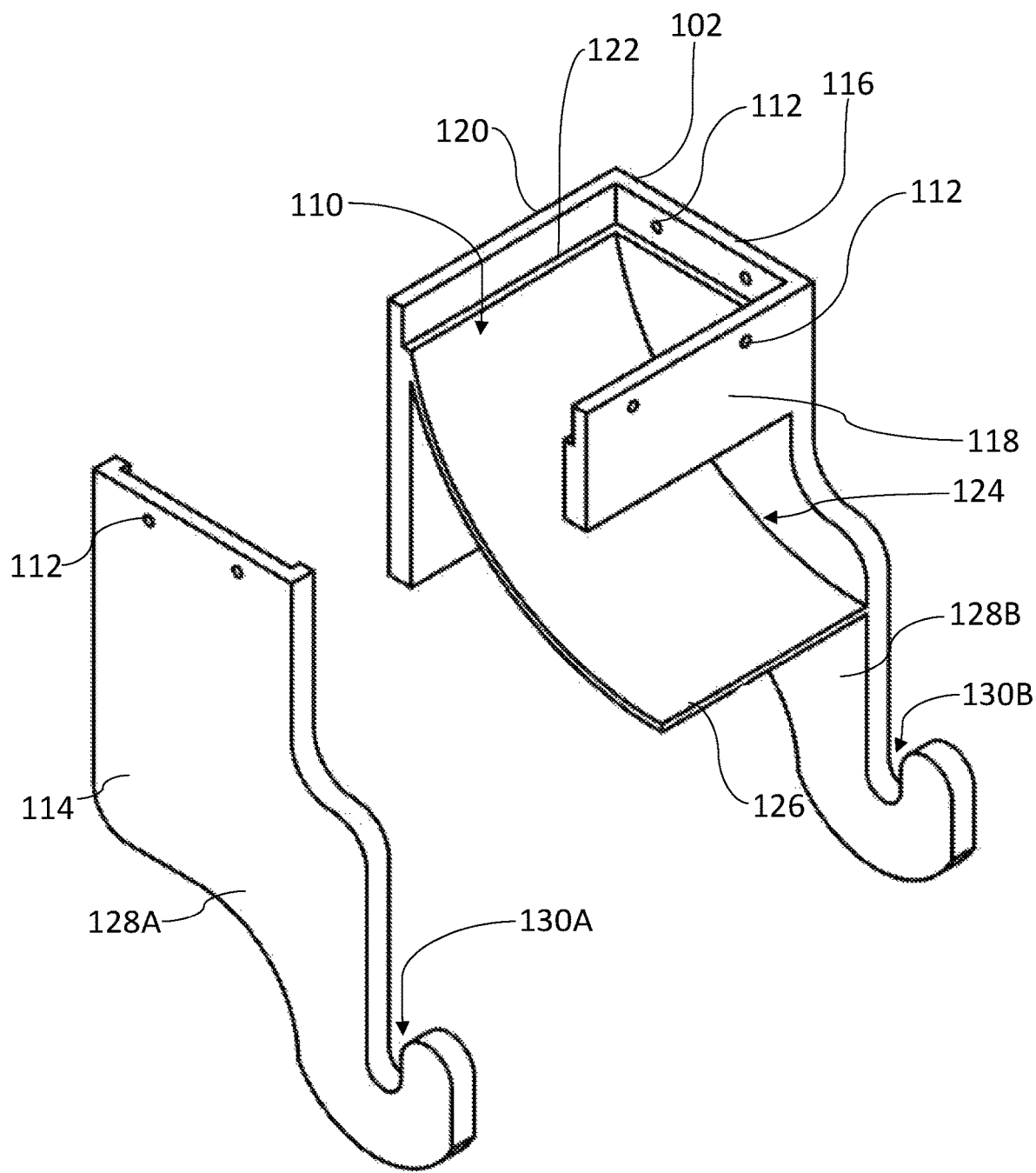
FIG. 5 illustrates a front, top perspective view of a decoupled adapter of a pivotable downspout extension system.
Figure 6:
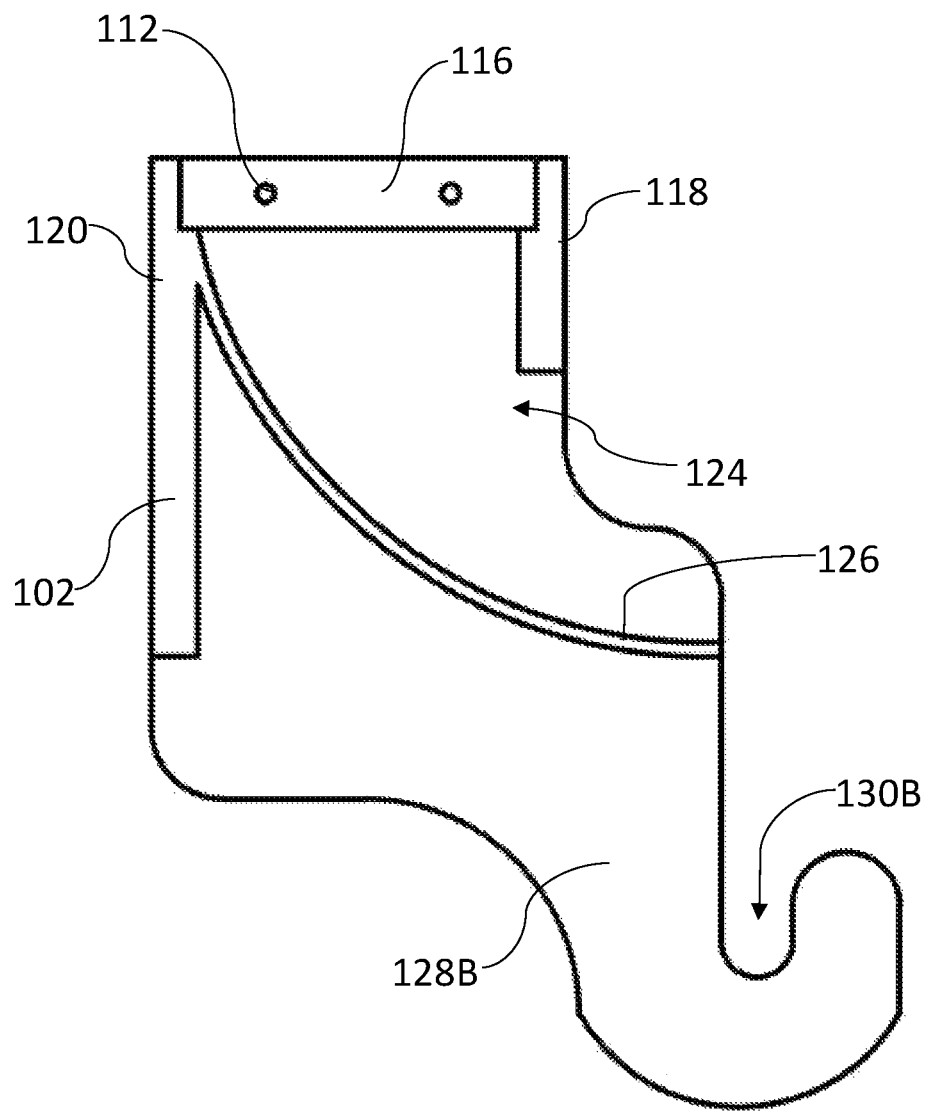
FIG. 6 illustrates a left, side elevation view of a decoupled adapter of a pivotable downspout extension system.
Figure 7:
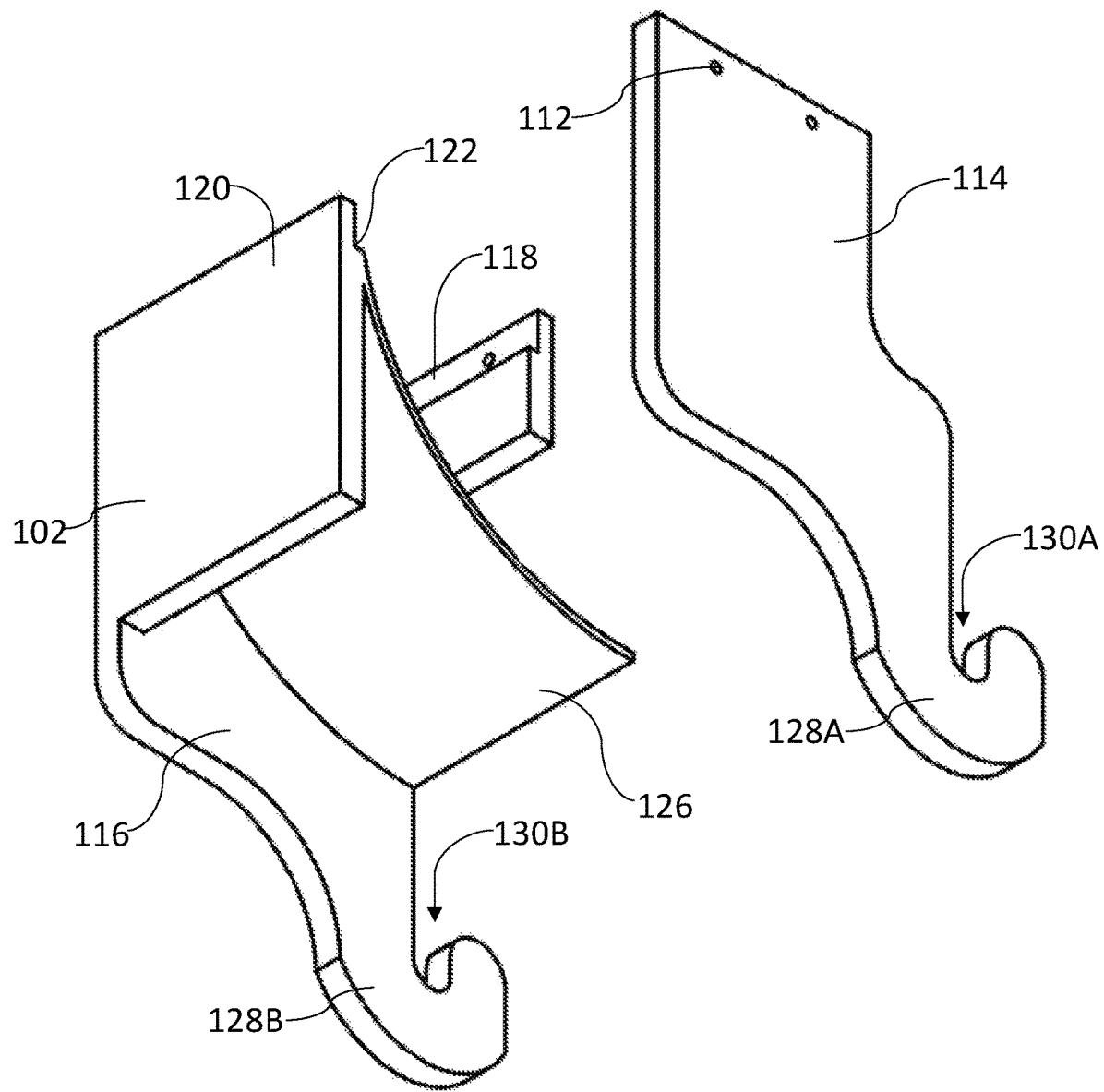
FIG. 7 illustrates a bottom perspective view of a decoupled adapter of a pivotable downspout extension system.

As shown in FIG. 4, the adapter 102 comprises a downspout aperture 110 for receiving the fixed-position downspout 104. Once the fixed-position downspout 104 is inserted therein, the adapter 102 is coupled to the fixed-position downspout 104 via a securement mechanism, such as screws, pins, etc. The securement mechanism may be inserted via a plurality of adapter apertures 112. While the adapter apertures 112 are shown, other attachment mechanisms may be used if apertures are not present, such as glue, crimping, etc.

Referring to FIGS. 4-7, the adapter 102 may further comprise a removably attachable sidewall 114, a fixed sidewall 116, a front wall 118, and a rear wall 120. The walls 114-120 comprise a lip 122 so as to limit the depth of insertion of the fixed-position downspout 104. The lip 122 allows the fixed-position downspout 104 to be consistently placed each time. The removably attachable side wall 114 may be removed from the adapter 102 so that the adapter 102 may be more easily coupleable to the fixed-position downspout 104. However, it will be appreciated that, in some embodiments, the adapter 102 is a single unit with no sidewalls removable therefrom. The front wall 118 comprises a water aperture 124 that extends between the removably attachable and fixed sidewalls 114, 116 and allows water traveling through the fixed-position downspout 104 to exit the pivotable downspout extension system 100. In addition, the water traveling through the adapter 102 is directed through the water aperture 124 via a slide 126 that is coupled to the rear wall 120 and the fixed sidewall 116. The gradual slope of the slide 126 controls the direction of the waterflow. While the slide 126 shown has a gradual slope, other angles of slopes may be used, such as a 45-degree angle. In some embodiments, the slide may comprise angled diverters (shown in FIGS. 17-18) to control the flow of water into the bucket 106 and prevent water from flowing around the bucket 106. The angled diverters may also prevent water from pooling on the ground around the building.

Further, the removably attachable sidewall 114 and the fixed sidewall 116 comprise connection arms 128A, 128B with coupling channels 130A, 130B at a distal end from the downspout aperture 110. As shown, the connection arms 128A, 128B may be hook-shaped or any other shape, such as straight descending arms that run parallel to the adapter 102. The connection arms 128A, 128B with the coupling channels 130A, 130B allow the adapter 102 to be hingedly coupleable to the bucket 106. It should be noted that the connection arms 128A, 128B are not limited to having coupling channels 130A, 130B and may include, for example, coupling apertures. Alternatively, the adapter 102 may couple to the bucket 106 via a rod that is inserted through apertures on the adapter 102 and on the bucket 106.

Figure 8:
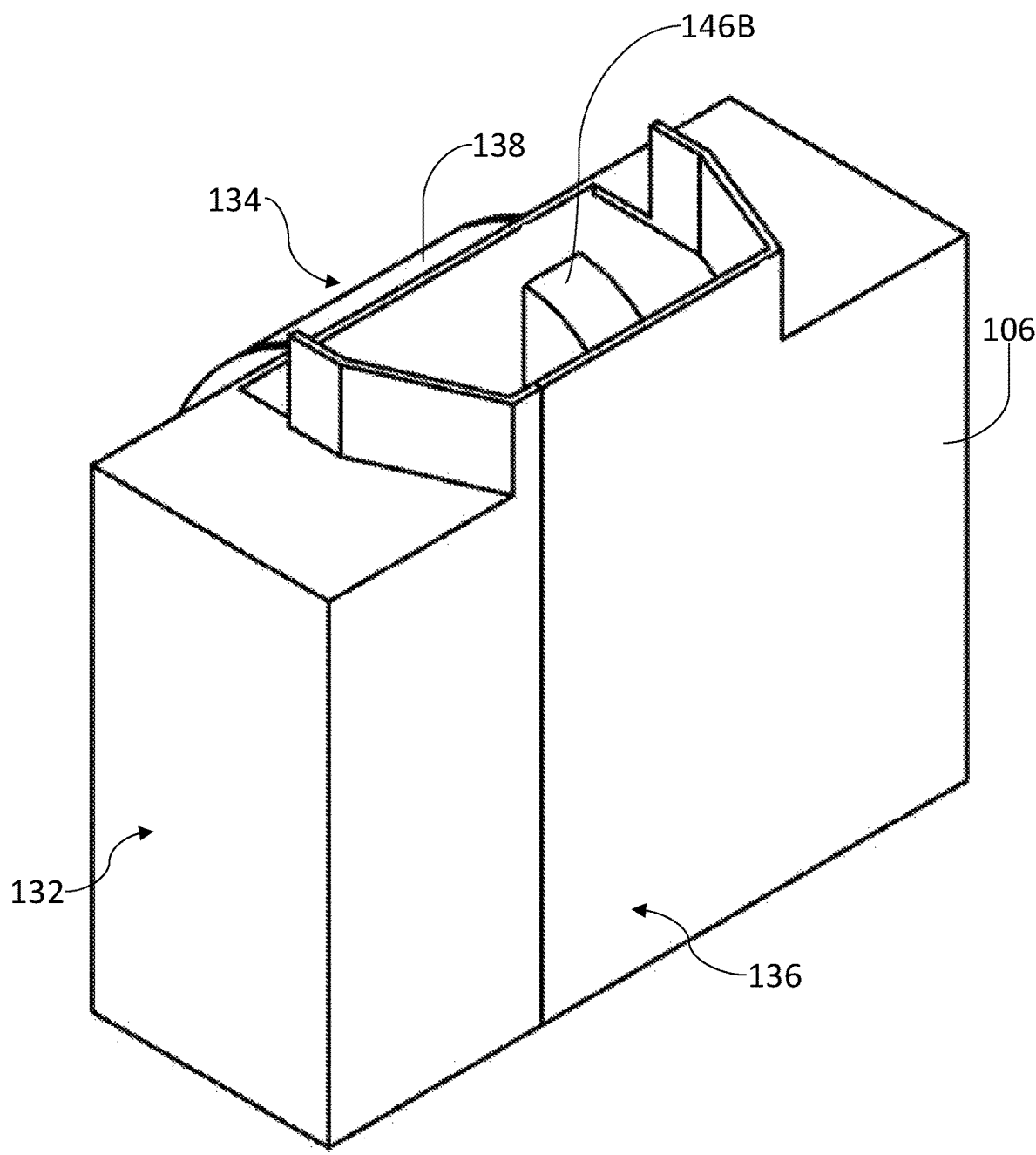
FIG. 8 illustrates a front, top perspective view of a bucket of a pivotable downspout extension system.
Figure 9:
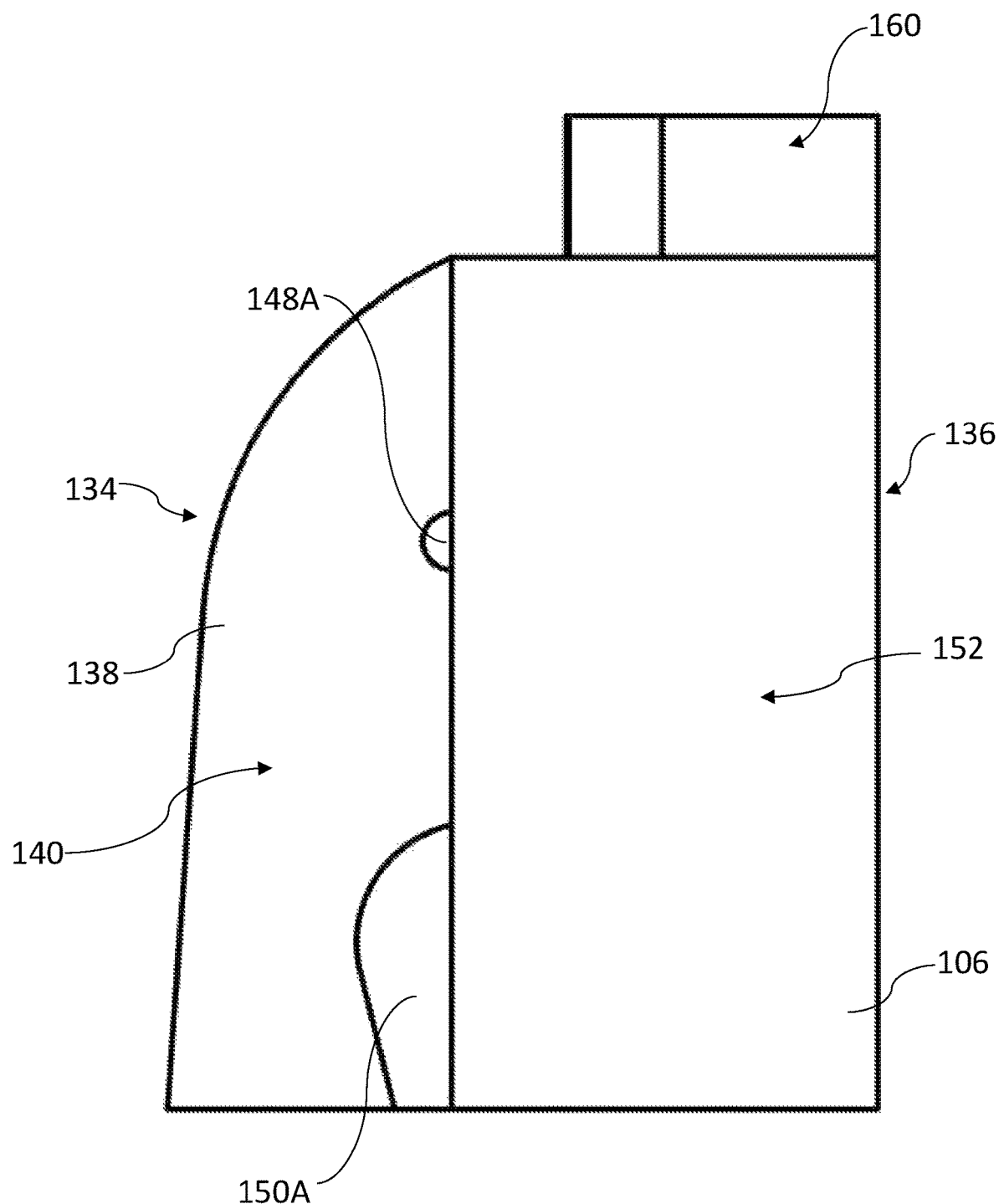
FIG. 9 illustrates a left, side elevation view of a bucket of a pivotable downspout extension system.
Figure 10:
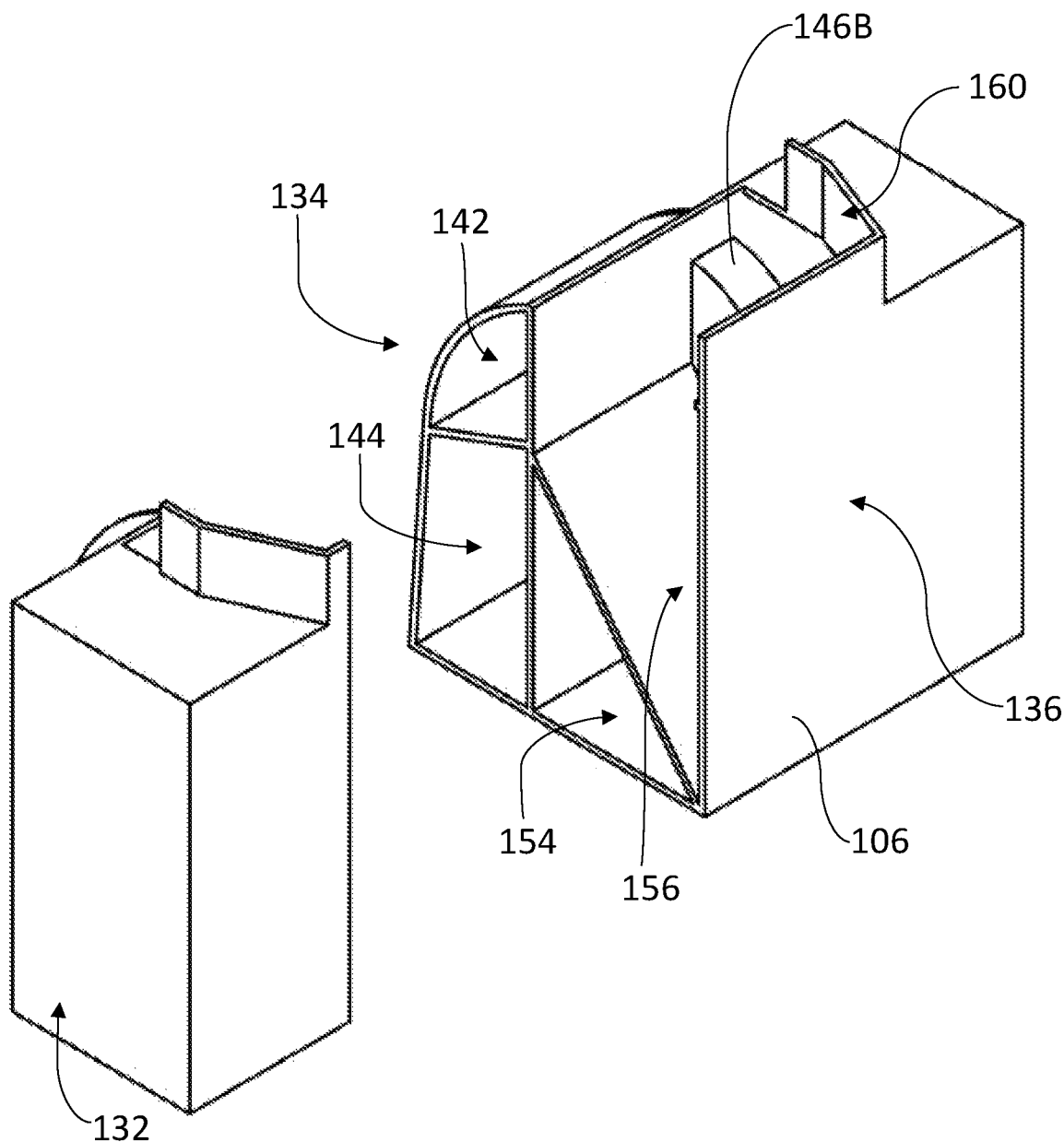
FIG. 10 illustrates a front perspective view of a decoupled bucket of a pivotable downspout extension system.
Figure 11:
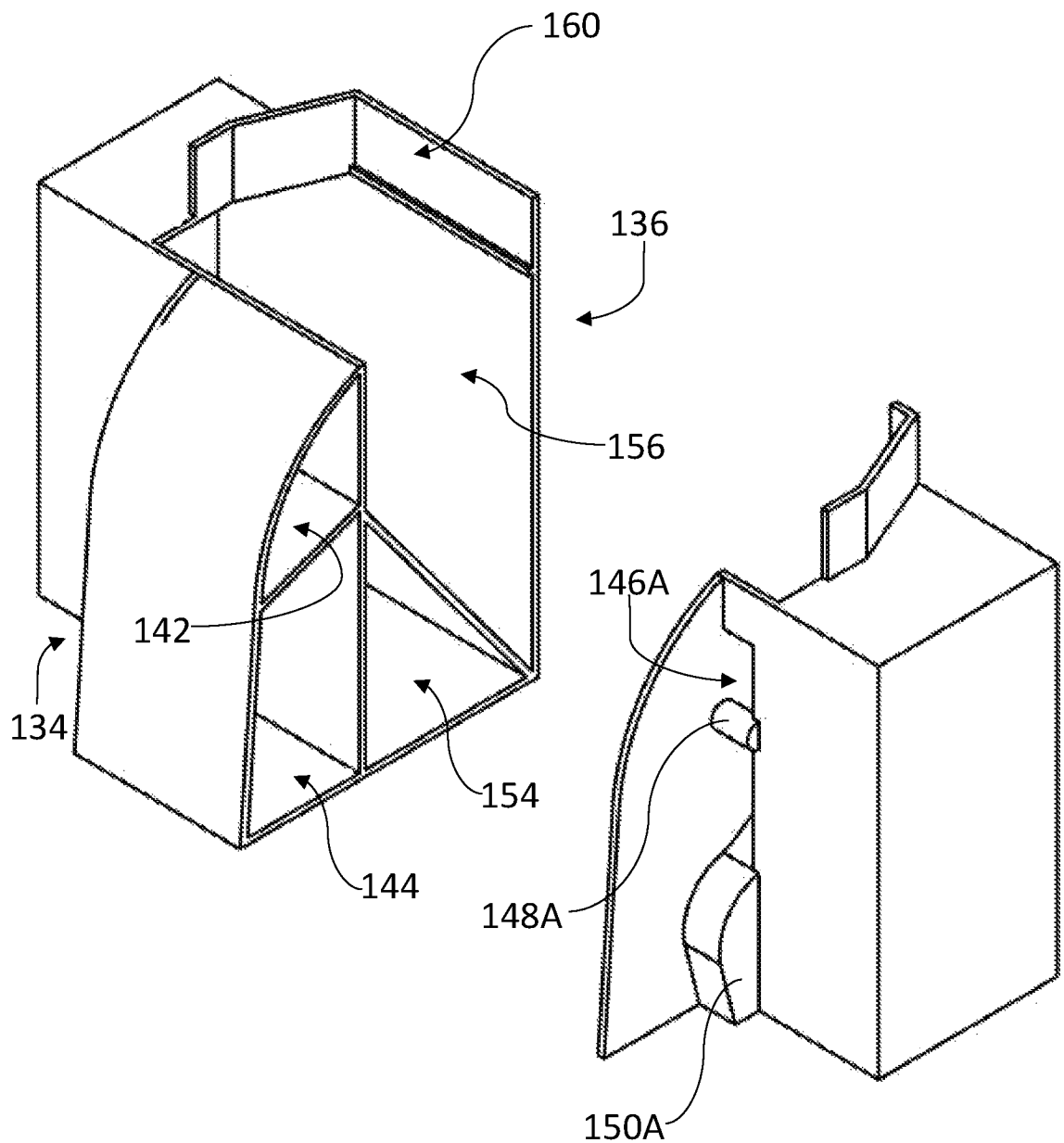
FIG. 11 illustrates a rear, top perspective view of a decoupled bucket of a pivotable downspout extension system.
Figure 12:
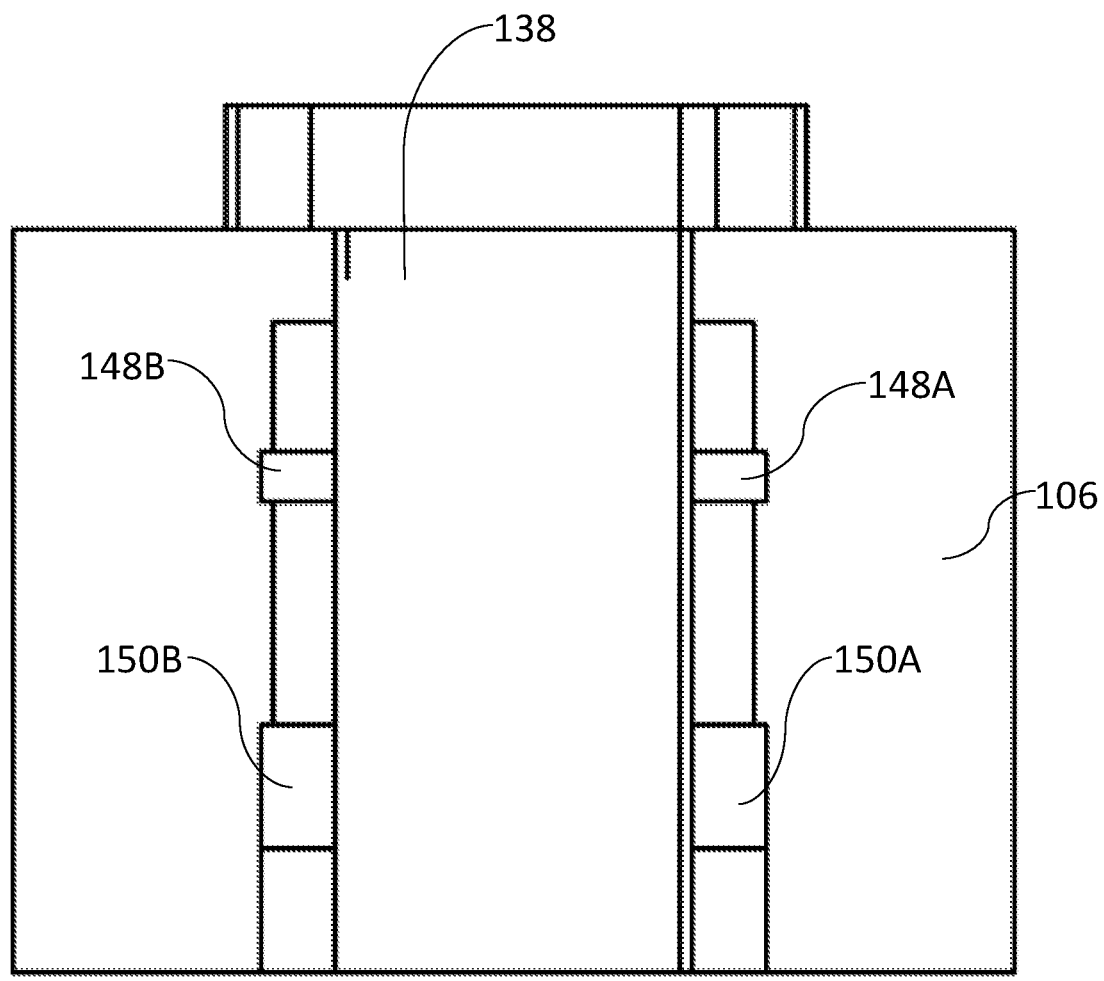
FIG. 12 illustrates a rear elevation view of a bucket of a pivotable downspout extension system.

Referring to FIG. 8, the bucket 106 may comprise a removably attachable section 132 that allows a user to attach more easily, and adjust, the bucket 106. However, in some embodiments, the bucket 106 is a single unit. Further, as shown in FIGS. 9-12, the bucket 106 comprises a rear portion 134 and a front portion 136. The rear portion 134 may comprise a sloped housing 138 protruding therefrom, with at least one chamber 140 therein. Additional chambers may include a first air chamber 142 and a weight chamber 144. The weight chamber 144 may be filled with a weighted material, such as iron, tin, steel, sand, etc., or the weight of the chamber may be altered due to the material forming the weight chamber 144. Further, a user may add or remove weight to adjust the system to the length of the extension arm 108. In other words, for the bucket 106 to operate properly when water enters therein, the weight of the bucket 106 may need to change depending on the length of the extension arm 108. It will be appreciated that a user may add weight to the bucket 106 in a variety of ways, such as by adding sand, steel pellets, etc. (also referred to herein as a "weighted bucket"). The rear portion 134 further comprises connection arm channels 146A, 146B and connection pins 148A, 148B so as to receive the connection arms 128A, 128B. For example, the connection arms 128A, 128B are inserted into the connection arm channels 146A, 146B, with the connection pins 148A, 148B resting in the coupling channels 130A, 130B. This allows the bucket 106 to be hingedly coupled to the adapter 102, creating a fulcrum for the pivotable downspout extension system 100. It will be appreciated that other mechanisms for coupling the bucket 106 to the adapter 102 may be used, such as ball bearings coupled to the connection arms 128A, 128B that will reduce friction. Lastly, the rear portion 134 comprises protrusions 150A, 150B, located on each side of the sloped housing 138, to limit the movement of the bucket 106 when water enters. For instance, as water enters the bucket 106, the bucket 106 will pivot until the protrusions 150A, 150B contact a lower edge 151A, 151B (shown in FIG. 14) of the removably attachable sidewall 114 and the fixed sidewall 116, which allows the bucket 106 to pivot to a desired position to allow water to exit.

Figure 13:
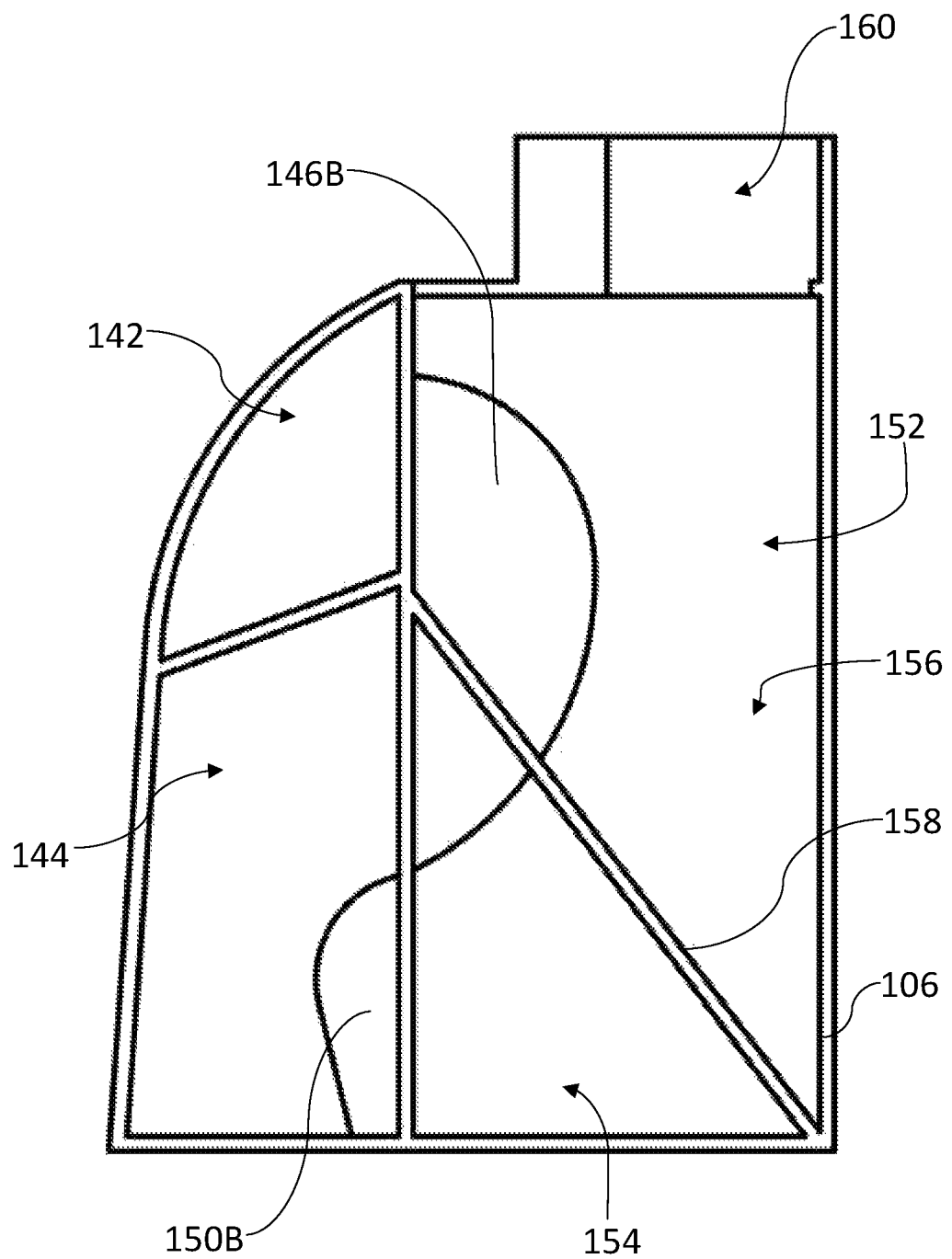
FIG. 13 illustrates a left, side elevation view of a decoupled bucket of a pivotable downspout extension system.

In addition, referring to FIG. 13, the front portion 136 comprises a plurality of chambers 152, which include a second air chamber 154 and a water chamber 156. The plurality of chambers 140, 142, 144, 152 for the front and rear portions 134, 136 may determine the vertical or lowered position of the bucket 106 when water is present or absent. While a plurality of chambers 140, 142, 144, 152 are shown, the bucket 106 may contain one or more chambers. In addition, the water and second air chamber 156, 154 may be separated by a divider 158 that is slanted so as to pool water away from the rear portion 134. In some embodiments, the water chamber 156 may comprise apertures to assist in draining any residual water when the bucket returns to the substantially vertical position.

The front portion 136 further comprises an extension arm receiving portion 160 that receives the extension arm 108. The extension arm 108 may be a piece of existing gutter cut to a desired length or a specifically made extension arm piece. In an alternate embodiment, the extension arm 108 is integrally formed with the bucket, making a single unit. The extension arm 108 may be coupled to the extension arm receiving portion 160 via, for example, crimping, glue, screws, etc. The bucket 106 and the extension arm 108 pivot into the lowered position, where water is released from a distal end of the extension arm 108. The extension arm 108, as shown in FIGS. 1-3, is of one length. However, the extension arm 108 may come in a variety of lengths, shapes, and sizes. For example, there may be a relatively short extension arm 108 that is cylindrical.

In one embodiment, the pivotable downspout extension system may comprise a channel running therethrough to accommodate heating tape or a heating coil to melt ice. More specifically, a covered channel may pass through some or all of the components of the pivotable downspout system, such as the adapter 102, the fixed-position downspout 104, the bucket 106, and the extension arm 108.

Figure 14:
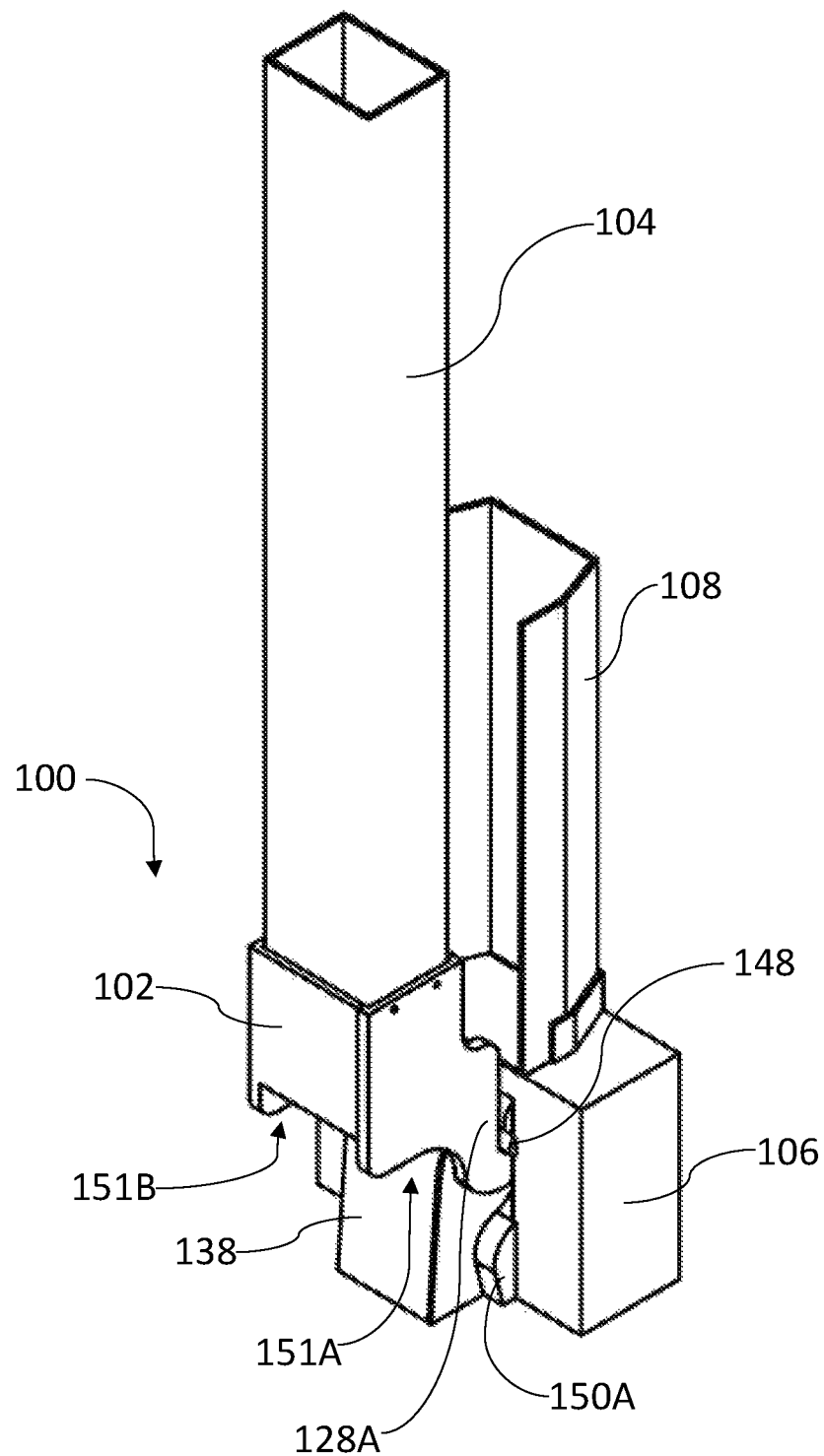
FIG. 14 illustrates a rear, top perspective view of a pivotable downspout extension system with an extension arm in a substantially vertical position.
Figure 15:
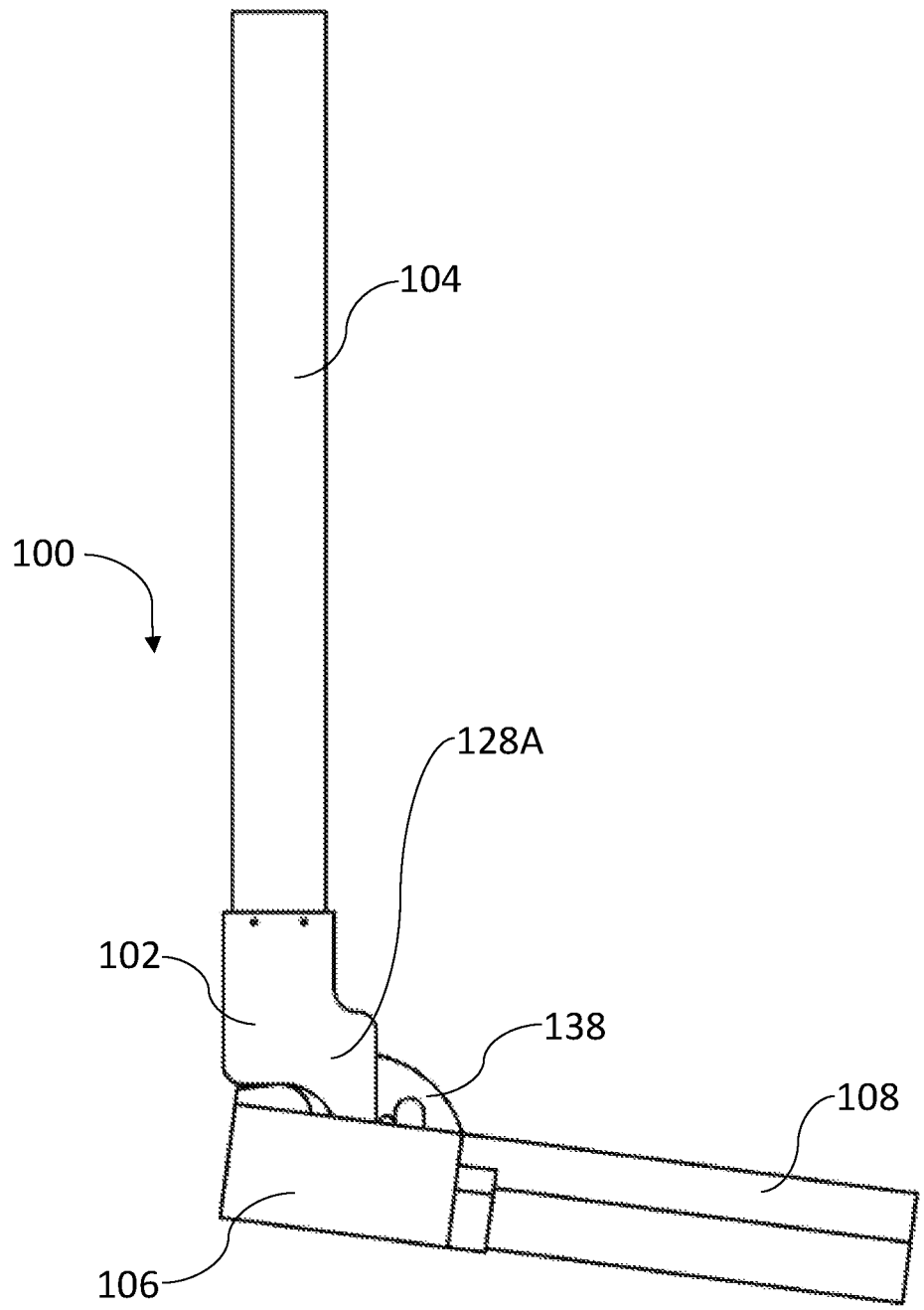
FIG. 15 illustrates a left, side elevation view of a pivotable downspout extension system with an extension arm in a lowered position.
Figure 16:
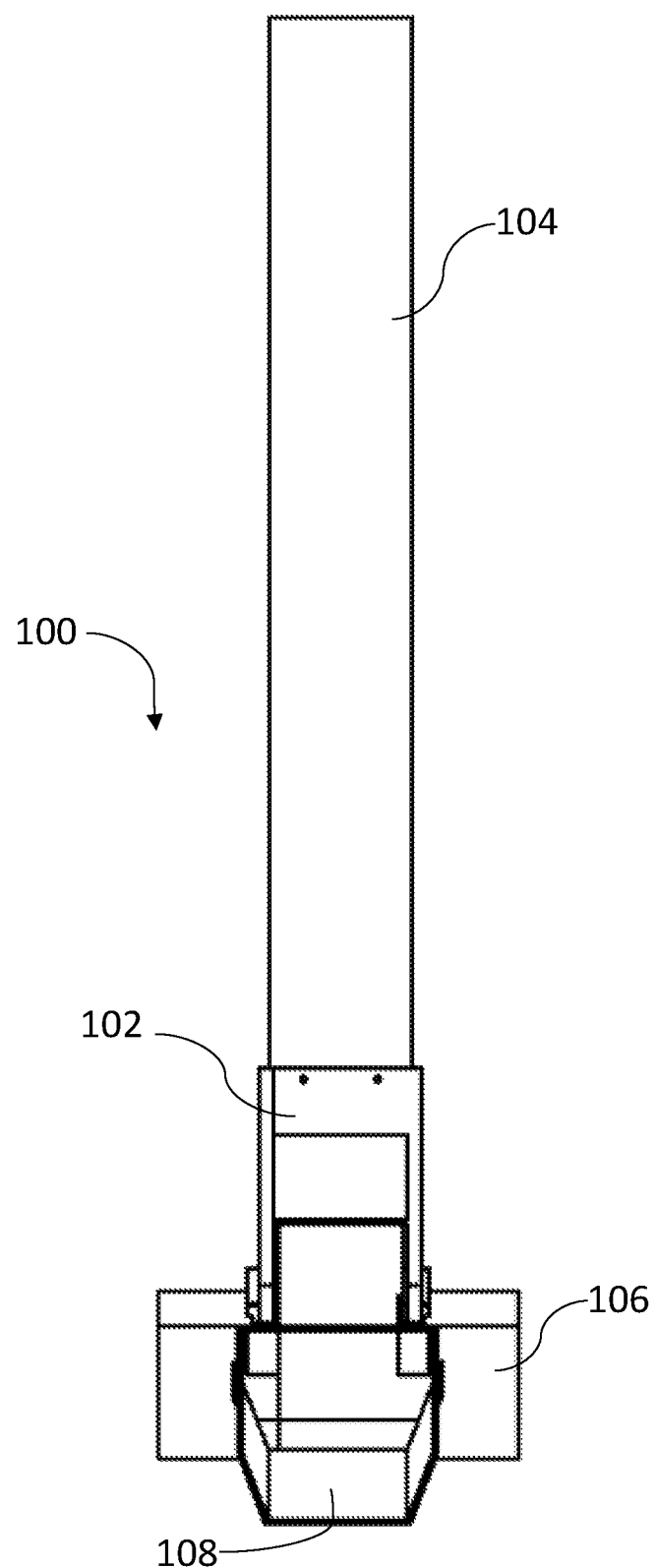
FIG. 16 illustrates a front elevation view of a pivotable downspout extension system with an extension arm in a lower position.

In one method of use, without water, the pivotable downspout extension system 100 has a stable equilibrium, with the extension arm 108 in a substantially vertical position (shown in FIG. 14). When water travels through a gutter system and to the fixed-position downspout 104, the water contacts the slide 126 of the adapter 102, the water is then directed into the water chamber 156. The water continues to collect until the equilibrium begins to be disturbed due to the center of gravity changing as additional water accumulates. Eventually, when the water exceeds a threshold amount (e.g., water weight exceeds the weights in the bucket) the bucket 106 pivots releasing the accumulated water via the extension arm 108 in the lowered position (shown in FIGS. 15-16). As water continues to travel through the pivotable downspout extension system 100, the bucket 106 and the extension arm 108 may stay in the lowered position. It will be appreciated that the sloped housing 138 assists water travel by acting as an additional path for the water. In other words, as the bucket 106 is lowered, the sloped housing 138 pivots and contacts the slide 126 so as to guide water coming from the slide 126 into the lowered extension arm 108. After water has ceased and the bucket 106 does not contain a threshold amount of water, the bucket 106, with the extension arm 108, returns to a substantially vertical position and a stable equilibrium due to the weighted chamber 144.

While the system 100 is shown in a substantially vertical or a lowered position, it will be appreciated that the system may be placed in more positions than a substantially vertical or a lowered position. For example, the bucket 106 and the extension arm 108 may be positioned at any angle between the lowered position and the substantially vertical position. The system 100 may not only be adjustable in the vertical and lowered positions but the side to side position may be adjusted as well. As an example, the pivotable downspout extension system 100 may pivot laterally, bringing the extension arm 108 closer to (e.g., parallel), or farther away from, the building on a horizontal plane. It will further be appreciated that the system 100 may be locked in a substantially vertical, lowered, or any other position via a securement mechanism, such as cotter pins, latches, etc.

In one embodiment, the bucket 106 comprises weight to hold the bucket 106 in a substantially vertical position. When water enters the bucket 106, the bucket 106 and the extension arm 108 move to a lowered position. Due to the weight, the bucket 106 remains in a lowered position (does not automatically move to the vertical position) when water flow ceases. To move the bucket 106 into a substantially vertical position, a user would manually raise the extension arm 108 and the bucket 106.

In one embodiment, a pivotable downspout extension system may comprise one or more springs on an adapter, coupling a bucket to a fixed-position downspout. In such an embodiment, once the weight of the water in the bucket overcomes the force applied by the springs, the bucket and the extension arm pivots so as to release the water therefrom. Once the water is released, the spring retracts, pulling the bucket and the extension arm back into the substantially vertical position.

Figure 17:
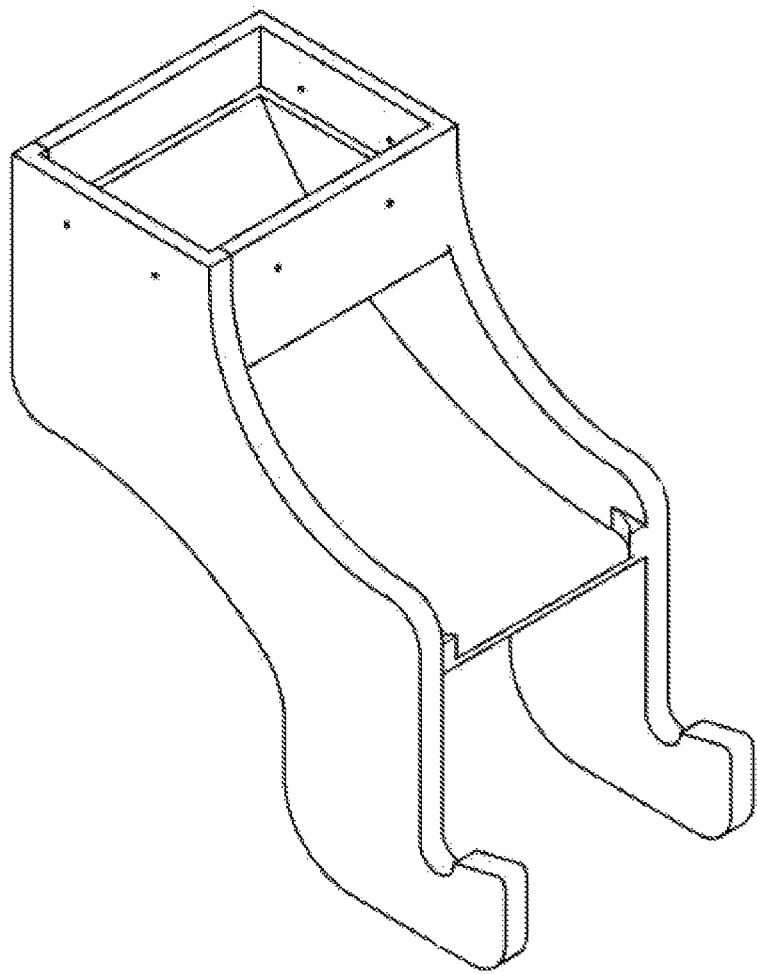
FIG. 17 illustrates a front, top perspective view of an adapter of a pivotable downspout extension system.
Figure 18:
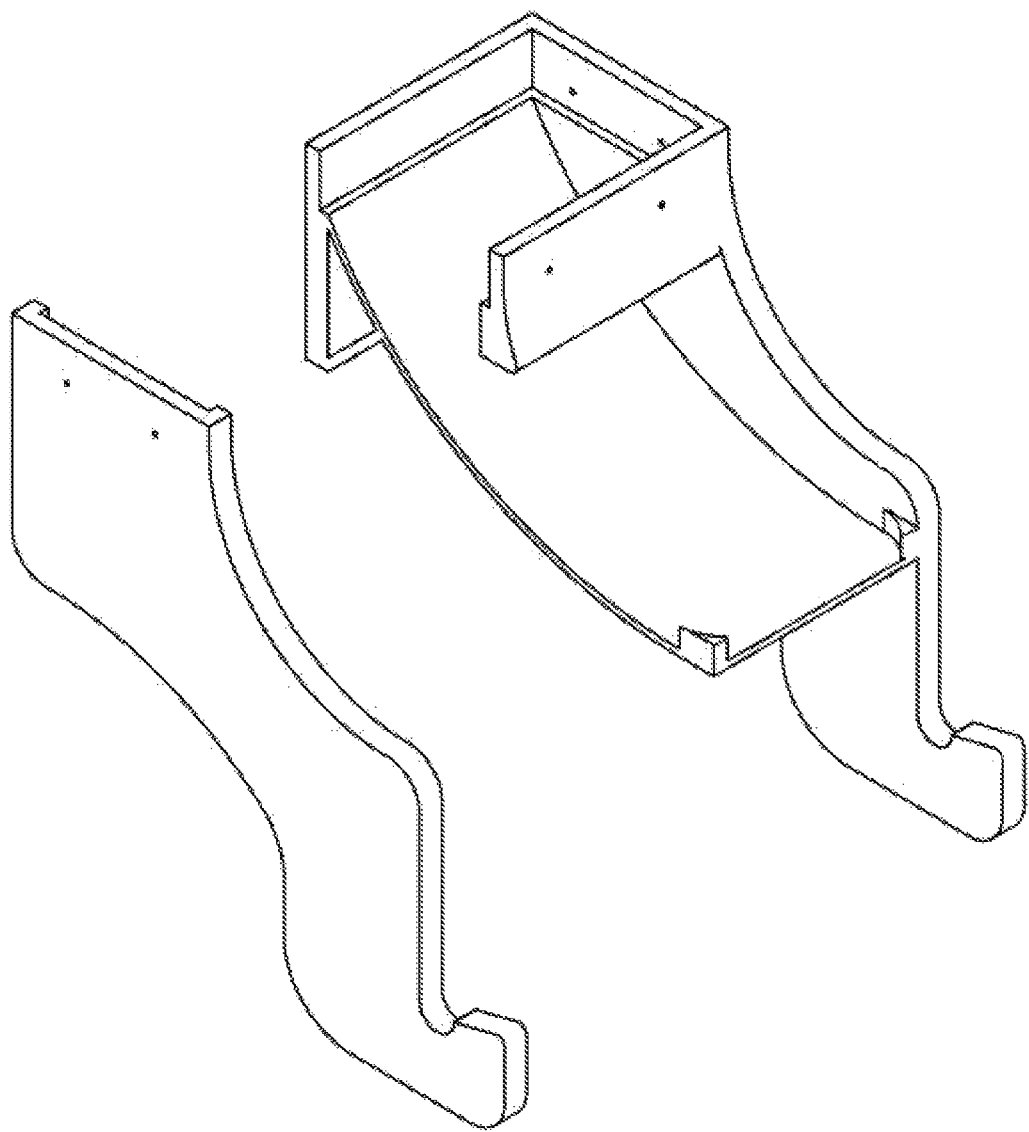
FIG. 18 illustrates a front, top perspective view of a decoupled adapter of a pivotable downspout extension system.
Figure 19:
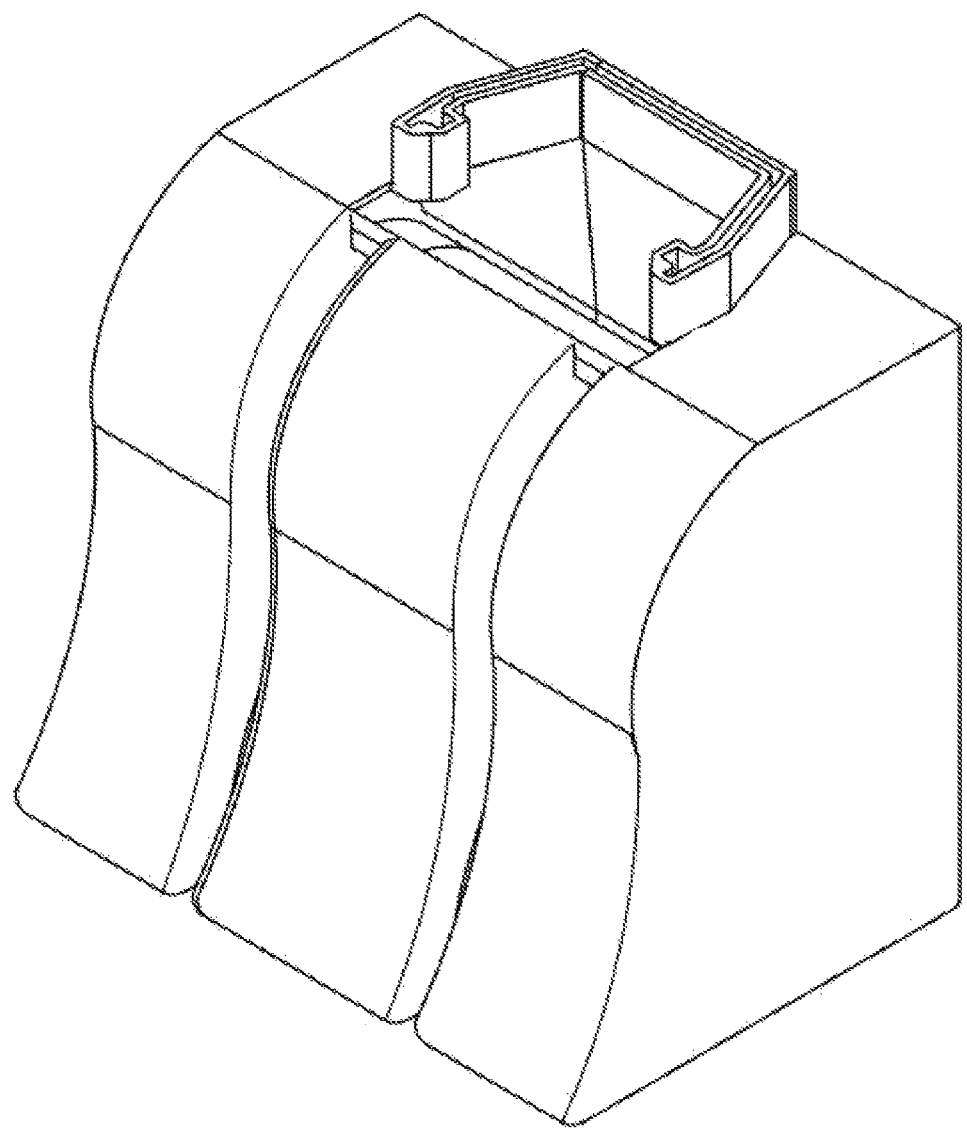
FIG. 19 illustrates a rear, left perspective view of a bucket of a pivotable downspout extension system.
Figure 20:
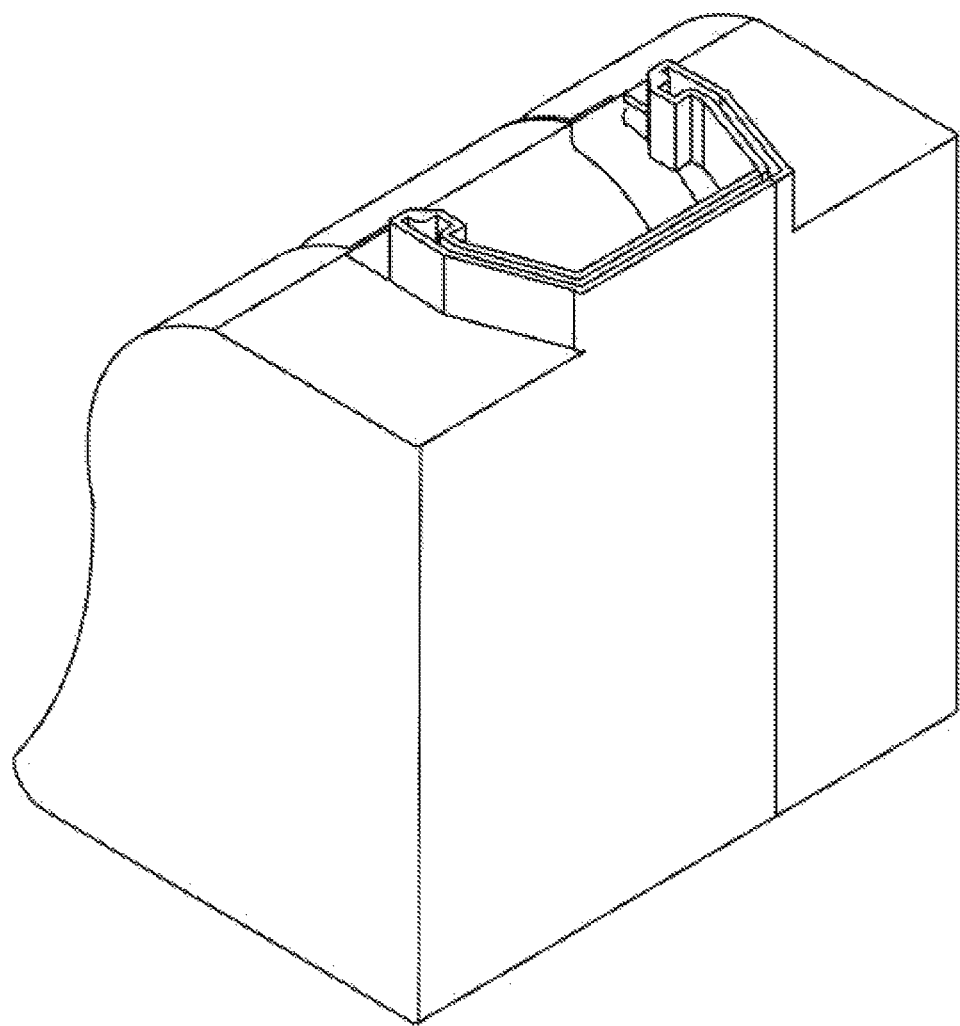
FIG. 20 illustrates a front, left perspective view of a bucket of a pivotable downspout extension system.
Figure 21:
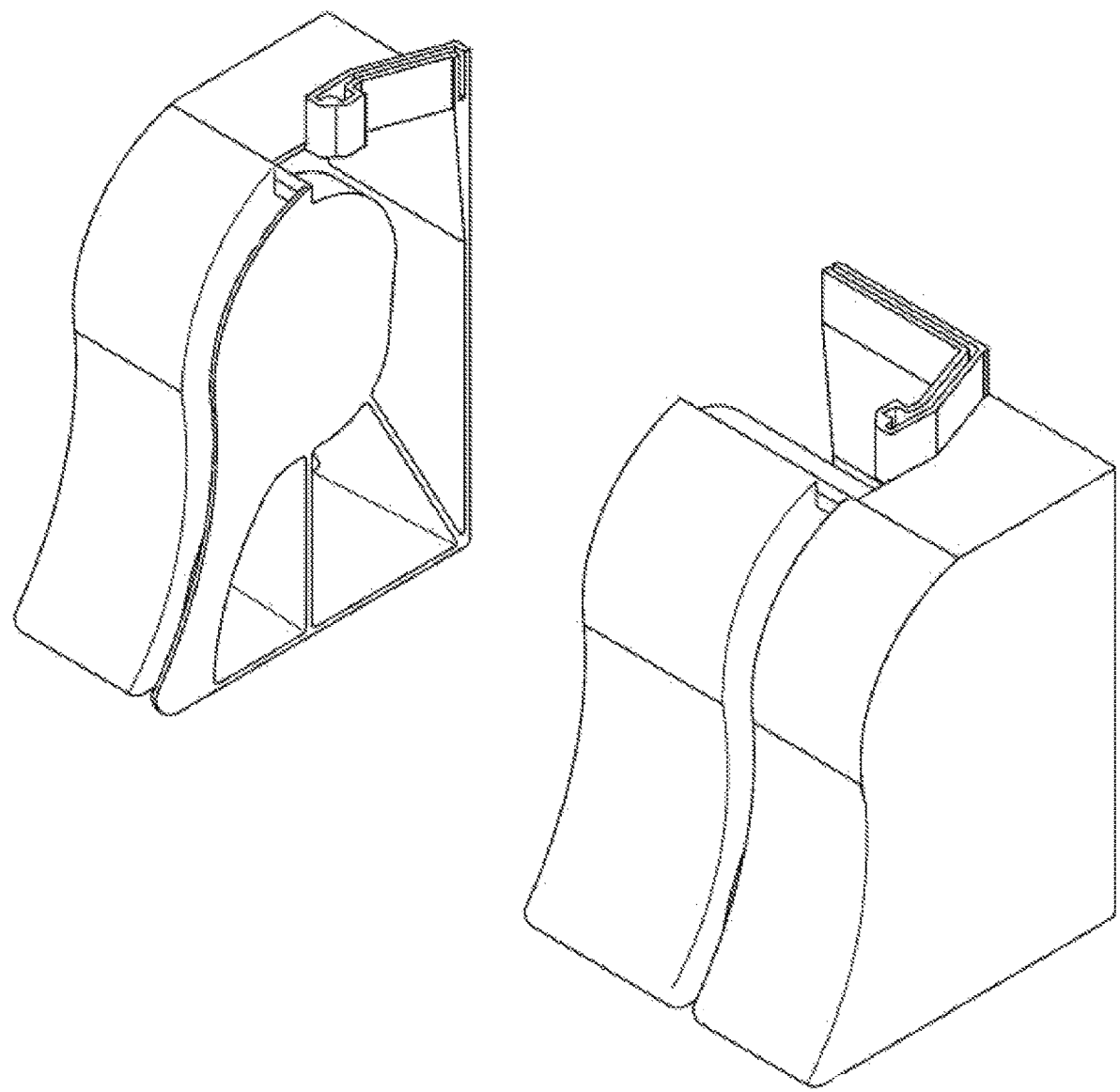
FIG. 21 illustrates a rear, left perspective view of a decoupled bucket of a pivotable downspout extension system.

Further, alternate designs of the adapter 102 and the bucket 106 may be shown in FIGS. 17-21. In particular, FIGS. 17-18 illustrate the adapter 102 having a different body design. FIGS. 19-21 also illustrate a different body design of the bucket 106.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A pivotable downspout extension system comprising:
    an adapter coupleable to a fixed-position downspout, the adapter comprising a removably attachable sidewall, a fixed sidewall, a front wall, and a rear wall, wherein the removably attachable sidewall and the fixed sidewall comprise connection arms with coupling channels at a distal end;
    a bucket, hingedly coupleable to the adapter, comprising a front portion and a rear portion, the front portion comprising a plurality of chambers and the rear portion comprising a plurality of chambers; and
    an extension arm coupled to the bucket and lowerable as water fills the bucket.

2. The pivotable downspout extension system of claim 1, wherein the adapter comprises a downspout aperture for coupling the adapter to the fixed position downspout.

3. The pivotable downspout extension system of claim 1, wherein the front wall comprises a water aperture for releasing water through the adapter.

4. The pivotable downspout extension system of claim 1, wherein the plurality of chambers of the rear portion comprise a weight chamber and a first air chamber.

5. The pivotable downspout extension system of claim 1, wherein the plurality of chambers of the front portion comprise a water chamber and a second air chamber.

6. The pivotable downspout extension system of claim 1, wherein the rear portion further comprises a sloped housing, connection channels, connection pins, and protrusions.

7. The pivotable downspout extension system of claim 1, wherein the front portion further comprises an extension arm receiving portion.

8. A pivotable downspout extension system comprising:
    an adapter coupleable to a fixed-position downspout, the adapter comprising:
        a removably attachable sidewall, a fixed sidewall, a front wall, and a rear wall, the removably attachable sidewall and the fixed sidewall comprising connection arms and coupling channels,
        a water aperture on the front wall, and
        a slide directing the flow of water out of the adapter;
    a bucket hingedly coupled to the adapter via the connection arms and coupling channels, the bucket comprising:
        a rear portion comprising a plurality of chambers and protrusions to control the movement of the bucket,
        a front portion comprising a plurality of chambers and an extension arm receiving portion; and
    an extension arm coupled to the bucket via the extension arm receiving portion and lowerable as water fills the bucket;
    wherein when water exceeds a threshold amount of the plurality of chambers on the front portion, the bucket and the extension arm pivot to a lowered position; and
    wherein when water in the plurality of chambers on the front portion does not exceed the threshold amount, the bucket and the extension arm pivot to a substantially vertical position.

9. The pivotable downspout extension system of claim 8, wherein the adapter comprises a downspout aperture for coupling the adapter to the fixed position downspout.

10. The pivotable downspout extension system of claim 8, wherein the rear portion further comprises a sloped housing, connection arm channels, and connection pins.

11. The pivotable downspout extension system of claim 8, wherein the plurality of chambers of the rear portion comprise a first air chamber and a weight chamber.

12. The pivotable downspout extension system of claim 8, wherein the plurality of chambers of the front portion comprise a second air chamber and a water chamber.

* * * * *